(12) United States Patent
Maletzko et al.

(10) Patent No.: US 6,448,300 B1
(45) Date of Patent: Sep. 10, 2002

(54) EXPANDABLE OLEFIN BEAD POLYMERS

(75) Inventors: Christian Maletzko, Altrip; Klaus Hahn, Kirchheim; Isidor de Grave, Wachenheim; Gerd Ehrmann, Deidesheim; Franz-Josef Dietzen, Ludwigshafen, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/669,733

(22) Filed: Sep. 26, 2000

(30) Foreign Application Priority Data

Oct. 20, 1999 (DE) .......................................... 199 50 420

(51) Int. Cl.⁷ ............................ C08J 9/18; C08J 9/228
(52) U.S. Cl. ........................ 521/60; 521/56; 521/59
(58) Field of Search ............................... 521/56, 60, 59

(56) References Cited

U.S. PATENT DOCUMENTS

| | | | | |
|---|---|---|---|---|
| 4,812,484 A | * | 3/1989 | Endo et al. | 521/60 |
| 4,908,393 A | * | 3/1990 | Arai et al. | 521/60 |
| 5,017,621 A | * | 5/1991 | Shiiki et al. | 521/60 |
| 5,091,435 A | * | 2/1992 | Susuki et al. | 521/60 |
| 5,389,320 A | | 2/1995 | Martynowicz | 264/53 |
| 5,773,481 A | | 6/1998 | Fischer et al. | 521/58 |

FOREIGN PATENT DOCUMENTS

| | | |
|---|---|---|
| EP | 0 540 271 A1 | 5/1993 |
| EP | 0 778 310 A2 | 6/1997 |

* cited by examiner

*Primary Examiner*—Morton Foelak
(74) *Attorney, Agent, or Firm*—Oblon, Spivak, McClelland, Maier & Neustadt, P.C.

(57) ABSTRACT

The invention relates to expandable olefin bead polymers which comprise a blowing agent with a boiling point of from −5 to 150° C., selected from the group consisting of alkanes, alkanols, ketones, ethers and esters. The particles are unfoamed and have a bulk density above 500 g/l, and can be foamed to a bulk density below 200 g/l after storage for one hour at room temperature in free contact with the atmosphere. They are prepared by impregnating polyolefin pellets in suspension in a pressure vessel with the blowing agent, cooling the batch below 100° C., reducing the pressure and isolating the particles.

19 Claims, No Drawings

EXPANDABLE OLEFIN BEAD POLYMERS

The invention relates to expandable olefin bead polymers which comprise blowing agent and can be expanded to give a moldable foam. Moldable polyolefin foams are increasingly used to produce foam moldings in automotive construction, in packaging and in the leisure sector. However, moldable foams are much more voluminous than unfoamed expandable beads, e.g. those based on polystyrene (EPS beads), and this is disadvantageous during transport and in storage, since the space required is large.

EPS beads can, is as known, be prepared by impregnating polystyrene pellets with a volatile hydrocarbon blowing agent in aqueous suspension, cooling the suspension and isolating the impregnated beads. Since polystyrene has good capabilities for retaining hydrocarbons, these diffuse only very slowly, so that the beads comprising blowing agent can be stored for prolonged periods without loss of blowing agent.

However, in the case of polyolefins this is not readily possible, and unfoamed expandable polyolefin beads have not therefore hitherto been available. The known expanded polypropylene moldable foams (EPP) are produced on an industrial scale by impregnating polypropylene pellets with a volatile blowing agent in aqueous suspension under pressure and reducing the pressure, whereupon the impregnated beads foam. The blowing agents used in practice comprise butane, dichlorodifluoromethane and $CO_2$. Since these blowing agents are lost again relatively rapidly by diffusion out of the polypropylene, polypropylene beads comprising blowing agent and prepared in this way have not been regarded as storable.

EP-A 540 271 describes a process for preparing expandable polyblend beads made from polyphenylene ether with a polyolefin. Here, minipellets made from a polyphenylene ether/polyolefin blend are impregnated in aqueous dispersion in a pressure vessel with a halogenated hydrocarbon blowing agent, preferably trichlorofluoromethane, the dispersion is cooled and the expandable beads are isolated. A disadvantage of the process is that it can apparently only be carried out with halogenated hydrocarbons as blowing agent. But these are environmentally hazardous. In addition, when the examples are repeated, very large-cell foams are obtained when the expandable beads are foamed.

It is an object of the present invention to provide unfoamed expandable beads made from olefin polymers, comprising a preferably halogen-free blowing agent and foamable to give small-cell foams. The olefin polymers must not comprise any admixed thermoplastics with a glass transition point above 180° C. (Polyphenylene ethers have a glass transition point at about 200° C.). It is preferable for there to be less than 5% by weight of thermoplastics of other types, and in particular for there to be none at all.

We have found that this object is achieved by expandable olefin bead polymers which may have been blended with up to 50% by weight, preferably less than 5% by weight, of a thermoplastic with a glass transition point below 180° C. and which comprise from 1 to 40% by weight of an organic blowing agent with a boiling point of from −5 to 150° C., based in each case on the weight of the olefin polymer.

The polymers are characterized by a bulk density above 400 g/l and in that they can be foamed to a bulk density below 200 g/l after storage for one hour at room temperature in free contact with the atmosphere by heating above 100° C. During this, the beads comprising blowing agent should melt at least to some extent, so that the foaming process can proceed to completion. In the case of the preferred propylene polymers, the ideal foaming temperature is from 130 to 160° C., preferably 150° C.

The invention further provides a process for preparing these expandable beads, in which polyolefin pellets are impregnated in suspension in a pressure vessel at elevated temperature with from 2 to 50% by weight of a preferably halogen-free, organic blowing agent, the batch is cooled below 100° C., and the impregnated pellets are isolated and washed.

EP-A 778 310 describes a process for preparing moldable polyolefin foams, in which a first step prepares partially foamed beads with a bulk density of from 120 to 400 g/l by extruding polyolefin comprising solid blowing agents, and a second step then uses steam to foam these further.

The novel expandable olefin bead polymers are practically unfoamed beads with a bulk density above 400 g/l, preferably above 500 g/l, and can be foamed to a bulk density below 200 g/l, preferably below 150 g/l and in particular below 100 g/l after storage for one hour, at room temperature in free contact with the atmosphere by heating above 100° C., and in the case of propylene polymers preferably at from 130 to 160° C., in particular at 150° C.

The first condition expresses the fact that the beads practically do not foam when the pressure on the impregnating batch is reduced. The olefin polymer pellets used as starting material have, depending on their composition and the shape of their particles, a bulk density of from 450 to 700 g/l. The second condition expresses the fact that, even after storage for one hour in free contact with the atmosphere, the beads still comprise sufficient stored blowing agent to be capable of good foaming. This storage for one hour at room temperature in free contact with the atmosphere is therefore significant in practice and is also realistic, since practical treatment and handling of the beads comprising blowing agent prior to their packing and after their removal from the packing prior to their foaming does not take more than one hour in total. Very little blowing agent should escape during this period. As the beads have generally been packed in sealed containers or in gas-tight film sacks when they are stored and transported, the amount of blowing agent which can escape during these stages is also insignificant.

The novel polyolefin beads comprising blowing agent can normally be stored for a number of days without escape of any substantial amount of blowing agent. Prolonged storage in the open should, however, be avoided.

For the purposes of the invention olefin polymers are
a) Homopolypropylene,
b) Random copolymers of propylene with from 0.1 to 15% by weight, preferably 0.5 to 12% by weight, of ethylene and/or a $C_4$–$C_{10}$-α-olefin, preferably a copolymer of propylene with from 0.5 to 6% by weight of ethylene or with from 0.5 to 15% by weight of 1-butene, or a terpolymer made from propylene, from 0.5 to 6% by weight of ethylene and from 0.5 to 6% by weight of 1-butene, or
c) A mixture of a) or b) with from 0.1 to 75% by weight, preferably from 3 to 50% by weight, of a polyolefin elastomer, e.g. an ethylene-propylene block copolymer with from 30 to 70% by weight of propylene.
d) Polyethylene (LLDPE, LDPE, MDPE, HDPE) or
e) A mixture of the polyolefins mentioned under a) to d) (if desired with addition of compatibilizers).

Olefin polymers prepared using either Ziegler or metallocene catalysts are suitable.

The crystalline melting point (DSC maximum) of the polyolefins listed under a) to e) is generally from 90 to 170°

C., their enthalpy of fusion, determined by DSC, is preferably from 20 to 300 J/g, and the melt index MFR (230° C., 2.16 kp for propylene polymers and 190° C., 2.16 kp for ethylene polymers) is preferably from 0.1 to 100 g/10 min to DIN 53 735.

Preferred polyolefins are homo- or copolymers of propylene with up to 15% by weight of ethylene and/or 1-butene, particularly preferably propylene-ethylene copolymers with from 1 to 5% by weight of ethylene. They have a melting point of from 130 to 160° C. and a density (at room temperature) of about 900 g/l.

The olefin polymer may have been blended with up to 50% of its weight of a thermoplastic of a different type and having a glass transition temperature (point of inflection in DSC curve) below 180° C. Examples of suitable thermoplastics are polyamides in amounts of from 5 to 40% by weight and conventional compatibilizers, e.g. block copolymers, such as Exxelor P 1015 (EXXON), may be added to the mixture here.

It has been found that the invention may also be worked without admixing a thermoplastic of a different type. This is preferred insofar as the presence of a foreign thermoplastic impairs the recycleability of the polyolefin and of the foam produced therefrom. Elastomeric ethylene-propylene copolymers which may be added for plasticization are not regarded for the purposes of the present invention as being of a different type.

The polyolefin may comprise the usual additives, such as antioxidants, stabilizers, flame retardants, waxes, nucleating agents, fillers, pigments and dyes.

The starting material for preparing the novel expandable polyolefin beads is polyolefin pellets, which preferably have average diameters of from 0.2 to 10 mm, in particular from 0.5 to 5 mm. These mostly cylindrical or round minipellets are prepared by extruding the polyolefin, if desired together with the thermoplastic to be admixed and with other additives, and if desired cooling, and pelletizing.

The minipellets should preferably comprise from 0.001 to 10% by weight of a nucleating agent, preferably from 0.1 to 5% by weight and in particular from 0.5 to 3% by weight. Examples of those suitable are talc, paraffins and/or waxes, and also carbon black, graphite and pyrogenic silicas, and also naturally occurring or synthetic zeolites and (modified or unmodified) bentonites. They bring about production of a small-cell foam, and in a good many cases foaming is impossible without them.

These pellets are dispersed in a suspension medium in a stirred reactor. A preferred suspension medium is water. In this instance it is necessary to add suspending agents, to ensure uniform distribution of the minipellets in the suspension medium. Suitable suspending agents are water-insoluble inorganic stabilizers, such as tricalcium phosphate, magnesium pyrophosphate and metal carbonates; others are polyvinyl alcohol and surfactants, such as sodium dodecylarylsulfonate. The amounts of these usually used are from 0.05 to 10% by weight. The addition of suspension stabilizers may be dispensed with if, as in WO-A 99/10419, the density of the suspension medium is lower than that of the suspended pellets. This is the case, for example, if the suspension medium is ethanol or a mixture of ethanol with up to 50% by weight of water.

The correct choice of blowing agent is significant for the invention. Its boiling point should be from −5 to 150° C., in particular from 25 to 125° C. The blowing agent is preferably an alkane, an alkanol, a ketone, an ether or an ester. Particular preference is given to pentanes, hexanes and heptanes, in particular sec-pentane, 3,3-dimethyl-2-butanone and 4-methyl-2-pentanone. It is also possible to use blowing agent mixtures. The blowing agent is preferably halogen-free. However, blowing agent mixtures which comprise small amounts, preferably less than 10% by weight, in particular less than 5% by weight, of a halogen-containing blowing agent, e.g. methylene chloride or fluorohydrocarbons, should not be excluded.

The amount of the blowing agent used is preferably from 2 to 50% by weight, in particular from 5 to 30% by weight, based on the pellets. The blowing agent may be added prior to, during or after the heating of the reactor contents. It may be introduced all at once or in portions.

During the impregnation the temperature should be in the vicinity of the softening point of the polyolefin. It may be from 40 to 25° C. above the melting point (crystalline melting point), but should preferably be below the melting point. In the case of polypropylene, preferred impregnating temperatures are from 120 to 150° C.

Depending on the amount and nature of the blowing agent, and also on the temperature, the pressure which becomes established in the reactor is generally above 2 bar but not above 40 bar.

The impregnation times are generally from 0.5 to 10 hours. Prior to pressure reduction and removal from the stirred reactor, the suspension is cooled below 100° C., preferably to 10–50° C., by, for example, passing cooling water through the reactor jacket. Once the pressure has been reduced and the batch discharged from the reactor, the beads comprising blowing agent are isolated from the suspension medium and washed.

The beads comprising blowing agent may be foamed by conventional methods using hot air or steam in pressure prefoamers. Depending on the nature of the blowing agent and on the polymer matrix and the desired bulk density, the pressures used when foaming with steam are from 2 to 4.5 bar, the foaming times vary from 3 to 30 sec and the temperature during foaming should be above 100° C., and in the case of polypropylene in particular from 130 to 160° C. A single foaming gives bulk densities of from 20 to 200 g/l. Technical or economic reasons may also make it expedient to use more than one foaming for low bulk densities.

The resultant moldable foam may be used to produce foam moldings by known methods.

In the examples all parts and percentages are by weight.

EXAMPLES 1 TO 12

A. Preparation of the minipellets (MP)

1. Starting Materials:

PP: NOVOLEN 3200 MC polypropylene from Targor GmbH

PA: ULTRAMID B 3 polyamide from BASF Aktiengesellschaft

PPE: NORYL 8390 polyphenylene oxide from General Electric Comp.

EX: EXXELOR P 1015 compatibilizer from Exxon Corp.

KR: KRATON G 1701 E compatibilizer from Shell Corp.

Wax: LUWAX AF 31 polyethylene wax from BASF Aktiengesellschaft

BE: Bentonite EXM 948 from Südchemie AG

2. Mixtures:

| MP 1: | 100 | Parts of PP |
| --- | --- | --- |
|  | 0.5 | Parts of wax |
|  | 1 | Part of talc |
| MP 2: | 95 | Parts of PP |
|  | 4.75 | Parts of PA |
|  | 0.25 | Parts of EX |
|  | 0.1 | Parts of wax |
|  | 1 | Part of talc |

-continued

| | | |
|---|---|---|
| MP 3: | 70 | Parts of PP |
| | 28.5 | Parts of PA |
| | 1.5 | Parts of EX |
| | 0.1 | Parts of wax |
| | 1 | Part of talc |
| MP 4: | 70 | Parts of PP |
| | 30 | Parts of PPE |
| | 5 | Parts of KR |
| | 0.1 | Parts of wax |
| | 1 | Part of talc |
| MP 5: | 100 | Parts of PP |
| | 1 | Part of wax |
| | 1 | Part of talc |
| MP 6: | 100 | Parts of PP |
| | 2 | Parts of BE |
| | 1 | Part of wax |

3. Extrusion

The stated amounts of the starting materials are mixed in an extruder, extruded and pelletized. The minipellets have dimensions d=0.8 to 1 mm, l=2.3 to 2.8 mm.

EXAMPLES 1 TO 6

B. Preparation of the expandable beads in a 260 ml stirred autoclave
1. Starting Materials and Amounts

| | |
|---|---|
| Minipellets | 33.3 g |
| Water | 106.7 g |
| Blowing agent | 10.7 g |
| Tricalcium phosphate | 2.9 g |
| Sodium dodecylarylsulfonate | 0.1 g |

2. Impregnation

The starting materials were placed in a 260 ml stirred autoclave. The batch was heated to 140° C. and held at this temperature for three hours. The autoclave was then cooled to room temperature and the pressure reduced. The impregnated beads were isolated, washed, forced-air-dried and stored in a sealed container.

C. Foaming the expandable beads

The beads were removed from the container and stored for 1 hour at room temperature in free contact with the atmosphere. They were then foamed at 150° C. for 8 sec with steam (steam pressure 3.5 bar) in a conventional pressure prefoamer. Table 1 gives the minipellets and blowing agents used, the contents of blowing agent found prior to and after the holding period of one hour and the bulk densities of the beads, together with the nature of the cells in the resultant moldable foam.

TABLE 1

| Example | 1 | 2 | 3 | 4 | 5 | 6 c |
|---|---|---|---|---|---|---|
| Minipellets | MP1 | MP2 | MP3 | MP1 | MP1 | MP4 |
| Blowing agent | sec-pentane | DB | 4M2P | 4M2P | n-butane | Freon 11 |
| Prior content % | 15.5 | 19.2 | 22.8 | 17.9 | 7.2 | 17.6 |
| Subsequent content % | 5.9 | 9.3 | 9.9 | 9.4 | 3.5 | 12.4 |
| Prior bulk density g/l | 480 | 546 | 522 | 539 | 531 | 573 |
| Subsequent bulk density g/l | 88 | 51 | 86 | 70 | 147 | 278 |
| Nature of cells | small | medium-sized | medium-sized | small | small | large |

Blowing agents  DB = 3,3-dimethyl-2-butanone
4M2P = 4-methyl-2-pentanone
Freon 11 = trichlorofluoromethane Example 6c is comparative

EXAMPLES 7 TO 11

B. Preparation of the expandable beads in a 55 l stirred vessel
1a. Starting Materials and Amounts (Examples 7 to 9)

| | |
|---|---|
| Minipellets | 11.93 kg |
| Water | 26.50 kg |
| Blowing agent | 2.50 kg |
| Calcium carbonate | 1.05 kg (Calcilit 1G, from Alpha) |
| Lutensol AO 3109 | 1.07 g (surfactant from BASF AG) |

1b. Starting Materials and Amounts (Example 10)

| | |
|---|---|
| Minipellets | 16.19 kg |
| Water | 20.24 kg |
| Blowing agent | 3.40 kg |
| Calcium carbonate | 1.42 kg (Calcilit 1G, from Alpha) |
| Lutensol AO 3109 | 1.46 g (surfactant from BASF AG) |

1c. Starting Materials and Amounts (Example 11)

| | |
|---|---|
| Minipellets | 16.24 kg |
| Water | 20.30 kg |
| Blowing agent | 3.41 kg |
| Calcium carbonate | 1.06 kg (Calcilit 1G, from Alpha) |
| Lutensol AO 3109 | 1.46 g (surfactant from BASF AG) |

2. Impregnation

The starting materials were placed in a 55 liter stirred vessel. Within the heating time given in the table, the mixture was brought to 140° C. and held at that temperature for one hour, followed by cooling to room temperature and pressure release. The impregnated pellets were discharged onto a screen, where they were washed with water, and then stored in sealed drums. Specimens of these material were forced-air-dried and used for the foaming trials (see Table 2).

EXAMPLE 12

B. Preparation of the expandable beads in a 1.6 m³ stirred vessel
1c. Starting Materials and Amounts (Example 12)

| | |
|---|---|
| Minipellets | 423.3 kg |
| Water | 940.7 kg |

-continued

| Blowing agent | 88.9 kg |
|---|---|
| Calcium carbonate | 37.1 kg (Calcilit 1G, from Alpha) |
| Lutensol AO 3109 | 38.1 g (from BASF AG) |

2. Impregnation

The starting materials were placed in a 1.6 m³ stirred vessel. The mixture was then brought to 140° C. within a period of 5 hours and held at that temperature for one hour, followed by cooling to room temperature and release of pressure. The impregnated pellets were discharged onto a screen, where they were washed with water, and then stored in sealed drums. Specimens of these material were forced-air-dried and used for the foaming trials (see Table 2).

EXAMPLES 7 TO 12

C. Foaming the expandable beads

The foaming was carried out as described in Examples 1 to 6 under C. See Table 2 for results.

TABLE 2

| Example | 7 | 8 | 9 | 10 | 11 | 12 |
|---|---|---|---|---|---|---|
| Minipellets | MP1 | MP5 | MP6 | MP1 | MP1 | MP1 |
| Heating time [h] | 1 | 1 | 1 | 5 | 5 | 5 |
| Blowing agent | sec-pentane | n-heptane | sec-pentane | sec-pentane | sec-pentane | sec-pentane |
| Prior content % | 8.7 | 12.0 | 10.8 | 12.5 | 12.1 | 13.6 |
| Subsequent content % | 4.6 | 4.9 | 7.3 | 5.7 | 5.7 | 5.9 |
| Prior bulk density [g/l] | 564 | 562 | 562 | 563 | 558 | 562 |
| Subsequent bulk density [g/l] | 73 | 154* | 46 | 67 | 61 | 78 |
| Nature of cells | small | small | small | small | small | small |

*non-standard vapor pressure: 4 bar, 8 sec

We claim:

1. Expandable polymer or copolymer beads consisting essentially of propylene with up to 15% by weight of ethylene and/or 1-butene, from 1 to 40% of a halogen-free organic blowing agent with a boiling point of from −5 to 150° C., based in each case on the weight of said polymer or copolymer beads, wherein the unfoamed beads have a bulk density above 400 g/l and can be foamed to a bulk density below 200 g/l after storage for one hour at room temperature in free contact with the atmosphere by heating above 100° C.

2. The expandable polymer or copolymer beads as claimed in claim 1, which comprises from 0.001 to 10% by weight of a nucleating agent, based on the weight of said polymer or copolymer beads.

3. The expandable polymer or copolymer beads as claimed in claim 1 blended with up to 50% by weight of a thermoplastic block copolymer compatibilizer or an elastomeric ethylene-propylene copolymer plasticizer, both having a glass transition point below 180° C.

4. The expandable polymer or copolymer beads as claimed in claim 1 blended with from 5 to 40% by weight of a thermoplastic polyamide with a glass transition point below 180° C.

5. A process for preparing expandable polymer or copolymer beads consisting essentially of propylene with up to 15% by weight of ethylene and/or 1-butene comprising:

impregnating polymer or copolymer pellets consisting essentially of propylene with up to 15% by weight of ethylene and/or 1-butene with from 2 to 50% by weight of a halogen-free organic blowing agent with a boiling point of from −5 to 150° C. in suspension in a pressure vessel at elevated temperature, reducing the pressure on the batch and isolating and washing the impregnated pellets, wherein the batch is cooled below 100° C. before the pressure is reduced to obtain expandable polymer or copolymer beads having a bulk density above 400 g/l.

6. The process as claimed in claim 5, wherein said organic blowing agent is an alkane, an alkanol, a ketone, an ether, an ester or mixtures thereof.

7. The process as claimed in claim 5, wherein said organic blowing agent is a pentane, a hexane, a heptane, 3,3-dimethyl-2-butanone or 4-methyl-2-pentanone.

8. The process as claimed in claim 5, wherein said polymer or copolymer pellets comprise from 0.001 to 10% by weight of a nucleating agent, based on the weight of said polymer or copolymer pellets.

9. The process as claimed in claim 8, wherein said nucleating agent is a wax and/or talc.

10. A process for producing foams comprising foaming expandable polymer or copolymer beads as claimed in claim 1.

11. The process as claimed in claim 10, wherein said foam is molded.

12. The expandable polymer or copolymer beads as claimed in claim 1, wherein said organic blowing agent is an alkane, an alkanol, a ketone, an ether, an ester or mixtures thereof.

13. The expandable polymer or copolymer as claimed in claim 1, wherein said organic blowing agent is a pentane, a hexane, a heptane, 3,3-dimethyl-2-butanone or 4-methyl-2-pentanone.

14. The expandable polymer or copolymer beads as claimed in claim 2, wherein said nucleating agent is a wax and/or talc.

15. The process as claimed in claim 5, wherein said polymer or copolymer pellets are blended with up to 50% by weight of a thermoplastic block copolymer compatibilizer or an elastomeric ethylene-propylene copolymer plasticizer, both having a glass transition point below 180° C.

16. The process as claimed in claim 5, wherein said polymer or copolymer pellets are blended with from 5 to 40% by weight of a thermoplastic polyamide with a glass transition point below 180° C.

17. The process as claimed in claim 5, wherein said temperature is from 120 to 150° C.

18. The expandable polymer or copolymer beads as claimed in claim 1, wherein said expandable polymer or copolymer beads have a bulk density of from 450 to 500 g/l.

19. The process as claimed in claim 5, wherein is obtained expandable polymer or copolymer beads having a bulk density of from 450 to 700 g/l.

* * * * *